United States Patent
Pusateri et al.

(10) Patent No.: US 7,175,862 B2
(45) Date of Patent: Feb. 13, 2007

(54) METHOD OF PREPARING KAKADU PLUM POWDER

(75) Inventors: Donald J. Pusateri, Hemet, CA (US); Gopi R. Menon, Riverside, CA (US); Luis I. Vergel de Dios, Walnut, CA (US); Lance E. Schlipalius, Victoria (AU)

(73) Assignee: Access Business Group International LLC, Ada, MI (US)

( * ) Notice: Subject to any disclaimer, the term of this patent is extended or adjusted under 35 U.S.C. 154(b) by 464 days.

(21) Appl. No.: 10/767,934

(22) Filed: Jan. 28, 2004

(65) Prior Publication Data

US 2005/0163880 A1 Jul. 28, 2005

(51) Int. Cl.
*A61K 65/00* (2006.01)
*A61K 36/00* (2006.01)
*C12P 1/00* (2006.01)

(52) U.S. Cl. .................. 424/777; 424/725; 435/41
(58) Field of Classification Search .............. 424/777, 424/725; 435/41
See application file for complete search history.

(56) References Cited

U.S. PATENT DOCUMENTS

| | | | |
|---|---|---|---|
| 4,227,999 | A | 10/1980 | Ebner |
| 4,407,821 | A | 10/1983 | Mendy |
| 4,775,477 | A | 10/1988 | Stahl et al. |
| 4,925,690 | A | 5/1990 | Odake |
| 4,959,237 | A | 9/1990 | Walker |
| 4,976,960 | A | 12/1990 | Grossman et al. |
| 5,330,654 | A | 7/1994 | Humphrey et al. |
| 5,484,594 | A | 1/1996 | Frangi et al. |
| 5,693,229 | A | 12/1997 | Hartmann |
| 5,804,192 | A | 9/1998 | Franc et al. |
| 6,027,757 | A | 2/2000 | Menon |
| 6,103,755 | A | 8/2000 | Bumann |
| 6,217,878 | B1 | 4/2001 | Menon et al. |
| 6,235,721 | B1 | 5/2001 | Ghosal |
| 6,245,360 | B1 | 6/2001 | Markowitz |

OTHER PUBLICATIONS

Wright, B., Good nosh in the bush, New Scientist, Oct. 2, 1993, 11 (abstract).
Peerzada, N., et al, Vitamin C and elemental composition of some bushfruits, Journal of Plant Nutrition, 1990, vol. 13, No. 7, pp. 787-793 (abstract).
Anon, New natural source of vitamin C [*Terminalia ferdinandiana*], Food Processing, USA, 1985, 46 (11) 32, 34 (abstract).
James, K.W., Analysis of indigenous Australian foods, Food Technology in Australia, 1983, vol. 35, No. 7, pp. 342-343 (abstract).
Brand, J., et al, The nutritional composition of Australian Aboriginal bushfoods, Food Technology in Australia, 1983, vol. 35, No. 6, pp. 293 . . . 298 (abstract).
Brand, J.C., et al, An outstanding food source of vitamin C, Lancet, 1982, 2 (8303), 873 (abstract).
Aussie plum gets thumbs up, Manufacturing Chemist, Jan. 1998, 69(1), 34 (abstract).
Plum contract for FPI, Speciality Chemicals, Dec. 1997, 17 (10), 381 (abstract).
Woods, Brian, 21.5 Kakadu plum (*Terminalia ferdinandiana*), The Australian New Crops Newsletter, Jul. 1998, Issue No. 10 (abstract).
Woods, Brian, 14.6 Kakadu plum (*Terminalia ferdinandiana*), The Australian New Crops Newsletter, Jul. 1995, Issue No. 4 (abstract).
Keith, Robert E., Antioxidants and Health, Alabama Cooperative Extension System, Nov. 1999, HE-778, pp. 1-4.
Ahmed, Amani K., et al, Horticultural development of Australian native edible plants, Australian Journal of Botany, 2000, 48 (4): pp. 417-426 (abstract).
Williams, Richard J., et al, Reproductive phenology of woody species in a north Australian tropical savanna, Biotropica, Dec. 1999, 31 (4): 626-636 (abstract).
Eamus, Derek, et al, Seasonal changes in photosynthesis of eight savanna tree species, Tree Physiology, Aug. 19, 1999 (10): pp. 665-671 (abstract).
Stynes, B., Opportunities for contributing to the development of Aboriginal food plants, Tropical Grasslands, Oct. 1997, 31 (4): pp. 311-314 (abstract).
Prior, L.D., et al, Seasonal trends in carbon assimilation, stomatal conductance, pre-dawn leaf water potential and growth in *Terminalia ferdinandiana*, a deciduous tree of northern Australian savannas, Australian Journal of Botany, 1997, 45 (1): pp. 53-69 (abstract).

(Continued)

*Primary Examiner*—Susan Hoffman
*Assistant Examiner*—Randall Winston
(74) *Attorney, Agent, or Firm*—Warner Norcross & Judd LLP

(57) ABSTRACT

A process for producing a kakadu plum powder having an increased amount of naturally occurring ascorbic acid and high ORAC value. The process of preparing the extract includes the following: disintegrating kakadu plum fruit; treating the disintegrated kakadu plum material with enzymes to at least partially digest the material; juicing the kakadu plum material and drying the juice to produce a powder. In a preferred embodiment, the kakadu plum juice is further clarified with ultrafiltration and concentrated by performing reverse osmosis on the kakadu plum juice. The resultant kakadu plum powder has a natural ascorbic acid content of at least about 15% and a naturally occurring Oxygen Reduction Absorption Capacity value of at least 1500.

11 Claims, 1 Drawing Sheet

OTHER PUBLICATIONS

Ahmed, A.K., et al, Turner Review No. 3 Horticultural development of Australian native edible plants, Australian Journal of Botany, 2000, vol. 48 (4): pp. 417-426 (abstract).

Duff, G.A., et al, Seasonal patterns in soil moisture, vapour pressure deficit, tree canopy cover and pre-dawn water potential in a northern Australian savanna, Australian Journal of Botany, 1997, vol. 45 (2): pp. 211-224 (abstract).

Braithwaite, R.W., et al., Fire patterns and woody vegetation trends in the Alligator Rivers region of northern Australia, International Savanna Symposium conference paper, May 1984, pp. 359-364 (abstract).

Fletcher, R.J., International New Crop Development Incentives, Barriers, Processes and Progress: An Australian Perspective, Janick J. and Whipkey A. eds Trends in new Crops and New uses, 2002, pp. 40-54, ASHS Press, Alexandria, VA.

Phelps, D.G., Feasibility of a sustainable Bush food industry in Western Queensland, R.I.R. D. C. Research Paper Series No. 97/37, Jan. 1997, pp. 63-64, 69-70, 77-78.

Woods, Brian E., A Study of the Intra-Specific Variations and Commercial Potential of *Terminalia ferdinandiana* Exell (The Kakadu Plum),N. Territory Univ. M.SC thesis, Nov. 1994.

Chen, X., et al, Seasonal patterns of soil carbon dioxide efflux from a wet-dry tropical savanna of northern Australia, Austl. J. of Botany, 2002, p. 43-51, v 50(1) (abstract).

Thomas, D.S., et al, Seasonal patterns of xylem sap pH, xylem abscicic acid concentration, leaf water potential and stomatal conductance of six evergreen and deciduous Australian savanna tree species, Austrl. J. of Botany, 2002, pp. 229-236, v 50(2) (abstract).

Eamus, D. et al, Root biomass and root fractal analyses of an open Eucalyptus forest in a savanna of north Australia, Austl. J. of Botany, 2002, pp. 31-41, v 50(1) (abstract).

O'Grady, A.P., et al, Composition, leaf area index and standing biomass of eucalypt open forests near Darwin in the Northern Territory, Australia, Austl. J. of Botany, 2000, pp. 629-638, v 48(5) (abstract).

Ahmed, A.K., et al., et al, Horticultural Development of Australian Native Edible Plants, Austl. J. of Botany, 2000, pp. 417-426, v 48(4) (abstract).

Eamus, D., et al, Seasonal changes in photosynthesis of eight savanna tree species, Tree Physiology, Aug. 1999, pp. 665-671, v 19(10), Heron Pub. (abstract).

Prior, L.D., et al, Seasonal changes in leaf water characteristics of *Eucalyptus tetrodonta* and *Terminalia ferdinandiana* saplings in a northern Australian savanna, Austl. J.of Botany, 1999, pp. 587-599, v 47(4) (abstract).

Eamus, D., et al, A cost-benefit analysis of leaves of four Australian savanna species, Tree Physiology, Aug./Sep. 1998, pp. 537-545, v 18(8/9), Heron Pub. (abstract).

Hatton, T., et al, Does leaf water efficiency vary among eucalypts in water-limited environments?, Tree Physiology, Aug./Sep. 1998, pp. 529-536 v 18(8/9), Heron Pub. (abstract).

Myers, B.A., et al, Does irrigation affect leaf phenology in deciduous and evergreen trees of the savannas of northern Australia?, Austl. J. of Ecology, Aug. 1998, pp. 329-339, v 23(4) (abstract).

Prior, L.D., et al, Seasonal trends in carbon assimilation, stomatal conductance, pre-dawn leaf water potential and growth in *Terminalia ferdinandiana*, a deciduous tree of northern Australian savannas, Austl. J. of Botany, 1997, pp. 53-69, v 45(1) (abstract).

Lenore, Lindsey, Where next for bush foods?, Wanatca Yearbook 24, 2000, pp. 63-68 (abstract).

Ahmed, Amani K., et al, Horticultural development of Australian native edible plants, Austl. J. of Botany, 2000, pp. 417-426, v 48(4) (abstract).

Eamus, D., et al, A cost-benefit analysis of leaves of eight Australian savanna tree species of differing leaf life-span, Photosynthetica (Prague), 1999, pp. 575-586, v 36(4) (abstract).

Williams, Richard J., et al, Reproductive phenology of woody species in a north Australian tropical savanna, Biotropica, Dec. 1999, pp. 626-636, v 31(4) (abstract).

Stynes, B., Opportunities for contributing to the devlopment of Aboriginal food plants, Tropical Grasslands, Oct. 1997, pp. 311-314, v 31(4) (abstract).

Myers, Bronwyn A., et al, Seasonal variation in water relations of trees of differing leaf phenology in a wet-dry tropical savanna near Darwin, northern Australia, Austl. J. of Botany, 1997, pp. 225-240, v. 45(2) (abstract).

Williams, Richard J., et al, Windthrow in a tropical savanna in Kakadu National Park, northern Australia, J. of Tropical Ecology, 1995, pp. 547-558, v 11(4) (abstract).

Fensham, R.J., Phytophagous insect-woody sprout interactions in tropical eucalypt forest: I. Insect herbivory, Austl. J. of Ecology, 1994, pp. 178-188, v 19(2) (abstract).

Keighery, G.J., et al, Western Australian *Terminalia*-SP, Wanatca (West Aust Nut Tree Crop Assoc), 1987, pp. 34-43, Yearb 12(0) (abstract).

Williams, R.J., et al, Leaf phenology of woody species in a north Australian tropical savanna, Ecology, 1997, pp. 2542-2558, v 78(8) (abstract).

Duff, G.A., et al, Seasonal patterns in soil moisture, vapour pressure deficit, tree canopy cover and pre-dawn water potential in a northern Australian savanna, Austl. J. of Botany, 1997, pp. 211-224, v 45(2) (abstract).

Fensham, R.J., et al, A comparison of foliar nutrient concentration in trees from monsoon rainforest and savanna in northern Australia, Austl. J of Ecology, 1995, pp. 335-339, v 20(2) (abstract).

Peerzada, N., et al, Vitamin C and elemental composition of some bushfruits, J. of Plant Nutrition, 1990, pp. 787-793, v 13(7) (abstract).

Braithwaite, R.W., et al, Fire patterns and woody vegetation trends in the Alligator Rivers region of northern Australia, International Savanna Symposium, Brisbane, Australia, May 28-31, 1984, 1985, pp. 359-364, conference paper, Austl. Acad. of Sci., Canberra, Australia (abstract).

Brand, J.C., et al, The nutritional composition of Australian Aboriginal bushfoods, Food Tech. in Austl., 1983, pp. 293-298, v 35(6) (abstract).

James, K.W., Analysis of indigenous Australian foods, Food Tech. in Austl., 1983, pp. 342-343, v 35(7) (abstract).

Anon., New natural source of vitamin C (*Terminalia ferdinandiana*), Food Processing, 1985, pp. 32, 34, v 46(11), USA (abstract not available).

Benk, E., Less well-known tropical and subtropical fruits, Fluessiges Obst., 1986, pp. 61-63, v 53(2) (abstract).

Product Glossary and Product List, Jan. 2002, downloaded from http://www.cherikoff.com.au/glosdata/fruit/kakadu_plum.htm, Oct. 1, 2003.

Anonymous, New natural source of vitamin C ((*Terminalia ferdinandiana*)), Food Processing, USA 1985, vol. 46, No. 11, Oct. 1985, pp. 32, 34.

Kakadu plum (*Terminalia ferdinandiana*), Jul. 1988, The Australian New Crops Newsletter, Online!, No. 10, retrieved from the Internet on Apr. 6, 2005 at URL:http://www.newcrops.uq.edu.au/newslett/ncn10215.htm.

METHOD OF PREPARING KAKADU PLUM POWDER

BACKGROUND

The present invention relates to a method of producing a powder containing beneficial ascorbic acid, antioxidants and phytochemicals from the fruit of the kakadu plum plant, which is known under the scientific name, *Terminalia ferdinandiana*.

An objective of the health industry in recent years has been to reduce free radicals in the human body. Free radicals are chemicals that cause damage to tissue, cells, fat and proteins that come into contact with the free radicals. Oxygen, although an essential chemical of life, is one of the leading producers of free radicals in the body that causes oxidative damage. This damage has been linked to cardiovascular diseases, cataracts and DNA damage, which may lead to development of cancer or contribute to accelerated aging.

Conventional sources of natural Vitamin C include citrus fruits, for example, oranges, mandarins and grapefruit. Such fruits are preferred because of their availability and their satisfactory upper ascorbic acid content of about 0.5% by weight. Moreover, such natural sources of Vitamin C have a somewhat high ability to reduce free radicals. This ability is measured in Oxygen Radical Absorption Capacity ("ORAC") values. Conventional concentrated citrus fruit extracts typically have ORAC values around 750 ORAC units/100 gm.

A natural substitute for citrus-based ascorbic acid comes from acerola. Acerola, after undergoing conventional extraction, concentration and drying, typically has an ascorbic acid content of 15% and an ORAC value of about 1000.

Only recently has the health industry discovered an alternative source of natural Vitamin C in the fruit of the kakadu plum plant, known by the scientific name *Terminalia ferdinandiana*.

The kakadu plum fruit is an attractive alternative to conventional natural sources because of its high ascorbic acid content. Moreover, the kakadu plum fruit includes appreciable amounts of phytochemicals, for example, gallic acid, ellagic acid, and related compounds. These phytochemicals also have excellent antioxidant properties that have been implicated in cancer inhibition. Gallic acid has an antibacterial, antiviral and antifungul activities and also shows anti-inflammatory, anti-tumor, anti-mutigenic and anti-bronchodilatory activities. Ellagic acid has anti-carcinogenic effects against a wide range of carcinogens in many human tissues. Accordingly, in addition to providing enhanced ascorbic acid levels, the kakadu plum fruit provides many other beneficial phytochemicals.

However, several shortcomings are associated with use of the kakadu plum fruit as a natural source of ascorbic acid. First, the fruit itself has a tart or astringent taste, which makes it difficult to ingest directly as a source of Vitamin C. Second, the kakadu plum fruit includes pits to which the flesh of the fruit strongly clings. Third, the kakadu plum is an Aboriginal bush plant found only in the outback of Australia that has never been cultivated before. Thus, its availability is extremely limited. Finally, being a relatively new discovery as a natural source of Vitamin C, and given its limited availability, no commercial extraction methods are known which extract ascorbic acid and other valuable phytochemicals at beneficially high levels from the fruit.

SUMMARY OF THE INVENTION

The aforementioned problems are overcome in the present invention wherein kakadu plum powder is formed by enzymatically treating kakadu plum fruit before juicing and drying the concentrated juice to form the kakadu plum powder. More specifically, the invention is directed to a method of producing a kakadu plum powder having high levels of Vitamin C and Oxygen Reduction Absorption Capacity ("ORAC").

In one embodiment, kakadu plum fruit is harvested and de-pitted to separate the fruit pulp from the pits. The separated fruit pulp is enzymatically treated or digested to reduce the viscosity of the fruit pulp. The treated fruit pulp is expressed or squeezed to produce kakadu plum juice or extract. The Vitamin C content of the resultant kakadu plum juice is at least about 20% by weight and the ORAC value is at least about 1500. The juice is dried to form a kakadu plum powder.

In another embodiment, kakadu plum fruit juice is clarified using ultrafiltration. The remaining solids in the clarified juice are concentrated using reverse osmosis. The Vitamin C content of the resultant kakadu plum concentrate is at least about 25% by weight and the ORAC value is at least about 4000.

With the present inventive process, newly discovered problems, unique to processing the kakadu plum fruit, have been overcome. For example, it has been discovered that the kakadu pulp has a very high viscosity. It is believed that this is mainly due to the pectinaceous substances and possibly other polysaccharides that are present in the kakadu fruit. These viscous substances dramatically impede efficient processing and extraction of the kakadu fruit and, likewise, impact the final concentrate quality and yield. Accordingly, with the present inventive process, enzymes are used to lower the viscosity of the milled kakadu fruit, and in turn, obtain higher ascorbic acid levels and ORAC values. Moreover, with the ultrafiltration and reverse osmosis, even higher ascorbic acid levels and ORAC values may be obtained. Accordingly, the kakadu plum powder produced by the inventive process has high levels of natural ascorbic acid and other phytochemicals derived from the kakadu plum fruit. Further, the inventive process produced an increased juice yield from kakadu plum fruit material.

The present inventive process provides a commercially viable way to produce a powder high in Vitamin C and ORAC values from a natural source, the kakadu plum, which, until now, has only been able to be exploited on a whole fruit basis. Accordingly, the incorporation of dried kakadu solids as an additive in more tasty food products is a convenient method for a consumer to obtain the benefits of the high natural ascorbic acid and other phytochemicals.

These and other objects, advantages and features of the invention will be more readily understood and appreciated by reference to the detailed description of the invention and the drawings.

DETAILED DESCRIPTION OF THE INVENTION

Figure 1:
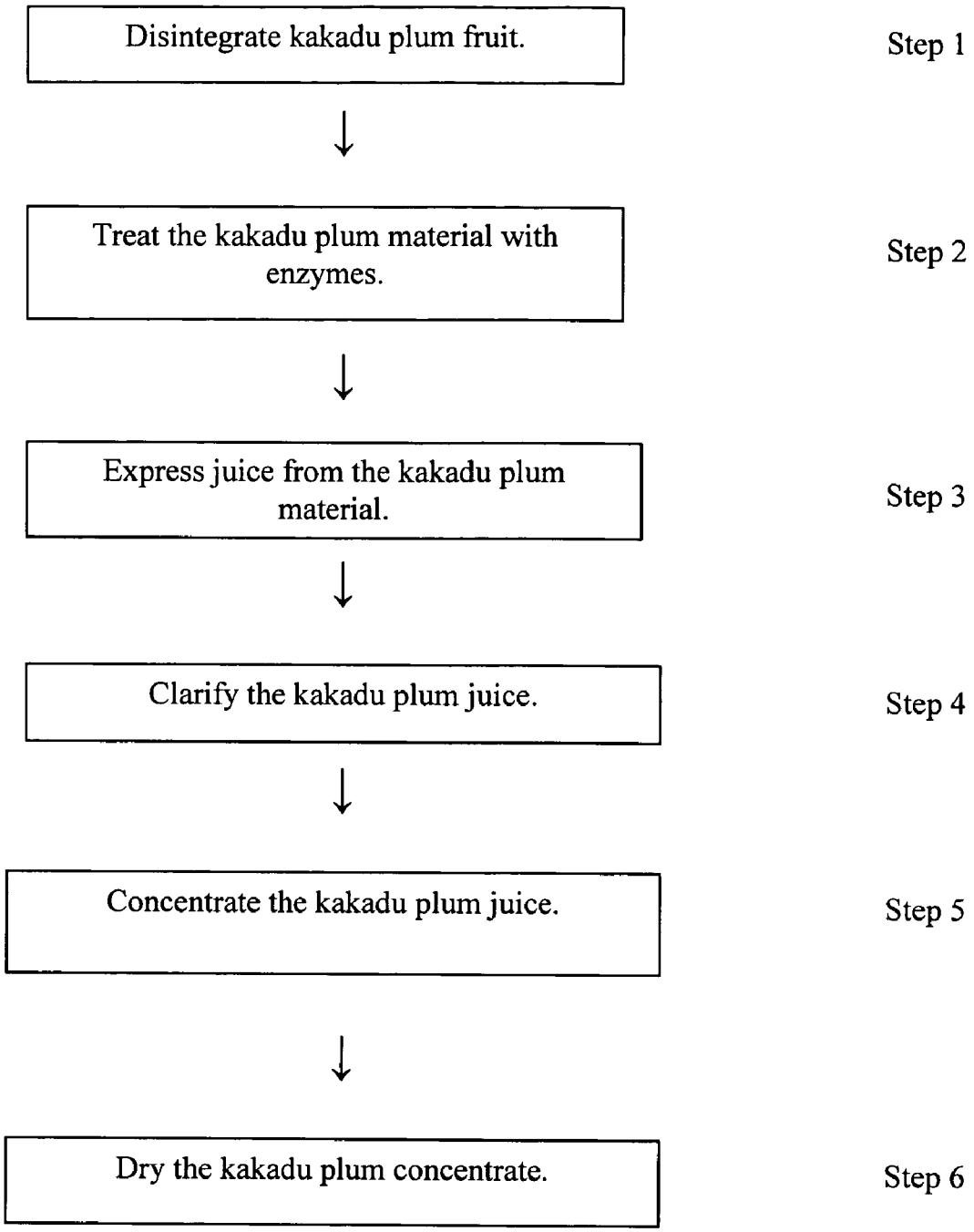
FIG. 1 is flow chart showing a preferred process of the present invention.

The inventive process for producing kakadu plum powder generally includes milling the kakadu plum material, digesting the milled material with enzymes and drying the material to form a powder. In an embodiment shown in FIG. 1, the process includes the following: (1) disintegrating the kakadu plum fruit; (2) treating the kakadu plum material with enzymes; (3) juicing the kakadu plum material; (4) clarifying the kakadu plum juice; (5) concentrating the kakadu plum juice; and (6) drying the concentrated juice to produce a powder.

The Kakadu Plum Fruit Stock

The process of the present invention is suitable for any kakadu plum plant varieties. It has been observed that certain "elite" kakadu plum trees yield fruit with higher ascorbic acid content. It is preferred that the fruit for processing be selected from these elite kakadu plum varieties to provide kakadu powder with the highest concentration of Vitamin C and high ORAC values. The kakadu plum fruit has a major dimension from about 1.5 centimeters to about 3 centimeters, approximately the size of an olive. Kakadu plum fruit also has a single hard seed, or "pit" or "stone". The pit in harvested kakadu plum fruit generally is about 1 centimeter (cm) to about 1.5 cm on its major dimension.

Optionally, the kakadu fruit is washed to separate the fruit from any associated dirt, leaves, small branches and other foreign material. This is preferably done in an agitated water bath. The fruit can also be quick frozen for processing at a later date.

Additionally, the selected fruit may be blanched to soften the fruit pulp to help increase subsequent juice yield and reduce microbiological activity, preferably, to provide a 2 to 3 logarithm reduction in bacteria located on the surface of the fruit. Effective blanching conditions include blanching with water for at least 1 minute at a temperature of about 100° C., more preferably, at a temperature of at least about 85° C. for up to about 8 minutes. Methods of blanching vegetables and related blanching equipment are known to those skilled in the art. U.S. Pat. No. 6,027,757 to Menon entitled "Process for Producing Dehydrated Plant Matter or Portions Thereof;" U.S. Pat. No. 6,217,878 to Menon entitled "Method of Preparing Echinacea Powder;" and U.S. Pat. No. 5,403,613 to Furui entitled "Method of Producing Carrot Juice" demonstrate blanching methods and are incorporated herein by reference.

Disintegrating the Kakadu Plum Fruit

Turning to Step 1, the kakadu plum fruit is processed through a disintegrator to separate the pulp or meat or flesh of the kakadu plum fruit from the pit. The disintegration step removes substantially all the fruit flesh from the pits. However, disintegration also may include milling the fruit in a coarse manner to macerate the skin and flesh of the fruit without disturbing the pit. Suitable machines for milling the kakadu plum fruit to separate the whole pits include a Corenco mill having a 0.5 inch or 0.63 inch mill head available from Corenco, Inc. of Sebastopol, Calif., U.S.A., or for coarse milling, a Urschel mill, preferably having a 0.5 inch, and more preferably 0.75 inch mill head, available from Urschel Laboratories, Velparaiso, Ind., U.S.A. under the designation "Comitrol® Processor."

After milling is complete, the pits may remain with the milled fruit flesh or may be removed as desired.

Enzyme Treatment

Treatment of the kakadu plum flesh with enzymes improves the extraction of the ascorbic acid and other phytochemicals from the fruit. In Step 2, the disintegrated fruit flesh is treated with an enzyme. It has been discovered that the milled flesh of the kakadu plum fruit is extremely viscous. Moreover, it has been discovered that lowering the viscosity of the kakadu flesh assists in obtaining higher soluble solids, ascorbic acid and ORAC values by breaking down pectinaceous substances. Preferably, water is added to the kakadu flesh during enzymatic treatment, also referred to as digestion, to extract desired phytochemicals from the fruit flesh and facilitate the enzymatic treatment. Excess water, however, increases the cost associated with evaporation and drying of the concentrate. Therefore, water is preferably mixed with the fruit flesh in ratios preferably of 3 parts water to 1 part fruit and more preferably 2 parts water to 1 part fruit. Optionally, the water-to-fruit ratio is 1 part water to 1 part fruit. In an exemplary mixture containing from about 1 part water to about 1 part fruit, the resultant enzymatically extracted kakadu fruit flesh contains from about 1% to about 8% soluble solids. As will be appreciated, variations of the mixing ratio of water to fruit influences the concentration of soluble solids in the extract. To convert the soluble solids including the ascorbic acid and other phytochemicals to a solid form, therefore, requires separation of about 92% to about 99% of the water from the extract mixture in later processing.

The enzymes used in the preferred method of extraction of ascorbic acid and other phytochemicals include pectinase and cellulase, which are commercially available from Novo Nordisk of Princeton, N.J., U.S.A.; Valley Research of South Bend, Ind., U.S.A. and Quest International of Kilnagleary, Carrigaline County, Cork, Ireland and MAK Wood, Inc., Thiensville, Wis., U.S.A. The pectinase enzyme functioned better than the cellulase enzyme for lowering viscosity. Suitable pectinase enzymes of the present invention include Pectinex Ultra SPL (Novo Nordisk); Pectinex AR (Novo Nordisk); and Crystalzyme PML-MX (Valley Research); Biopectinase Super 7X (Quest) and EZ9100 (MAK Wood, Inc.). Example 1 below demonstrates the effect of these enzymes on reducing the viscosity of slurries of kakadu material including the kakadu plum flesh as well as their effect on soluble solids, Vitamin C content and ORAC values for the product.

The enzymatic treatment may be carried out at ambient temperature, however, the rate of enzymatic activity is increased under higher temperatures. Preferably, the enzyme treatment lowers the viscosity of the extract to less than about 150 centipoises (cps), more preferably less than about 100, most preferably less than about 50 cps, and even more preferably less than about 10 cps. Enzymatic treatment is carried out at temperatures and durations, preferably from about 20° C. to about 50° C. for about 30 minutes to about 180 minutes, more preferably about from 30° C. to about 50° C. for about 60 minutes to about 120 minutes, and most preferably from about 40° C. to about 50° C. for about 90 minutes. If the enzyme will tolerate higher temperatures before decomposing, the enzymatic extraction may be carried out at temperatures at or greater than about 60° C.

Optionally, the milling and extraction steps can be carried out simultaneously. In such an operation, the kakadu plum fruit is milled with a 1:2 ratio of fruit to water at about 45° C. temperature. An enzyme is added simultaneously to facilitate breakdown or digestion of the kakadu plum fruit flesh. Suitable equipment for this operation is the APV Liquiverter available from APV Corporation of Townawanda, N.Y., U.S.A.

Expressing Kakadu Plum Juice

In Step 3, the kakadu plum juice is expressed from the kakadu plum fruit. To express the juice, the kakadu plum flesh material is squeezed or pressed by any number of devices known in the art, such as a screw press, hydraulic press or juicer. In one process, the juice is expressed by pressing the enzyme treated kakadu plum fruit (including the pits) in a screw press having a screen size of preferably 30-mesh to 100-mesh, more preferably from 50-mesh to 70-mesh and most preferably 70-mesh. This type of screw press is commercially available from Reitz, Inc. of Minneapolis, Minn., U.S.A. Preferably, the squeezing pressure is sufficient to produce at least about 50%, more preferably about 60%, and most preferably at least about 70% juice by weight of the expressed material, for example, at least about 10:7 extract ratio of expressed material (including the pits) to expressed juice.

The screw press expresses the juice and leaves behind a cake including the kakadu plum fiber and pit parts. The resultant pressed cake will have a moisture of preferably less than 55%, more preferably less than 52% and most preferably less than 50%. The resultant expressed kakadu plum juice has a soluble solids content of preferably at least about 3% soluble solids, more preferably at least about 4% soluble solids and most preferably at least about 5% solids.

Optionally, prior to expressing the kakadu plum juice, increasing the pH will result in an enhanced solid-liquid separation, thus improving ascorbic acid recovery.

Juice Clarification

It has been discovered that an ultrafiltration separation process is useful to clarify the juice thereby obtaining more soluble solids while increasing the high levels of ascorbic acid and ORAC values from the kakadu plum fruit. Turning to Step 4, the expressed kakadu juice is further clarified by cross-flow ultrafiltration to increase soluble solids content without significantly reducing ascorbic acid content or ORAC values of the expressed juice. Ultrafiltration is carried out using commercially available filter membranes, for example, commercially available flat sheet or tubular membranes. Preferably, the membranes have a molecular weight cut-off in a range from about 100,000 to about 200,000, more preferably about 200,000.

Ultrafiltration membranes of the type preferred in the present process are commercially available from a variety of sources including PCI Membranes, Laverstoke Mill, Whitechurche, United Kingdom. An alternative to cross-flow ultrafiltration is centrifuigation. Such centrifuigation preferably is carried out using a Alfa-Laval P-300, commercially available from the Alfa-Laval Group of Companies, Pennsylvania, U.S.A.

Optionally, the expressed kakadu juice may be clarified before ultrafiltration using macrofiltration. Specifically, the expressed kakadu juice is pumped through a 70-mesh or finer screen to remove large suspended solids.

Concentration

In Step 5, the expressed, clarified, juice is concentrated using reverse osmosis process to increase the soluble solids content and the ascorbic acid levels and ORAC. Reverse osmosis is preferably carried out using conventional reverse osmosis membrane configurations, including hollow-fiber, spiral-wound, flat sheet and tubular membranes. These types of membranes are commercially available from PCI Membranes. A preferred membrane is a polyamide, thin-film, composite, reverse-osmosis membrane having a sodium chloride rejection of 99% operable at pressures of up to 6400 milliPascals (mnpa) and commercially available from PCI Membranes. With reverse osmosis, the concentration of the soluble solids of the expressed kakadu plum juice removes sufficient water, concentrating the expressed juice to preferably 14% by weight soluble solids, more preferably 18% and most preferably about 22%.

Optionally, after the reverse osmosis step, a carrier may be added to the concentrated juice in an amount effective to produce free-flowing powder after the drying step discussed below. Suitable carriers, such as cellulose, maltodextrin, food starch and microcrystalline cellulose are known to those of skill in the art. Preferably, the carrier is a non-hygroscopic material such as food starch and microcrystalline cellulose so that the dried powder may be tableted if desired without increasing the tablet's moisture uptake. The effective amount of carrier depends on the amount of soluble solids present. Effective amounts of added carrier are preferably 40%, more preferably 30% and most preferably less than 25% by weight of the total soluble solids of the expressed juice after ultrafiltration and reverse osmosis. High levels of carriers are fluctional, however, may be unnecessary to maintain the free-flow of the dry solids.

Additionally, the juice may be heat-treated to further stabilize the concentrated juice, for example, to further reduce the microbiological or enzymatic activity. One method is to pasteurize the concentrated juice by exposing it to temperatures from about 80° C. to about 120° C. for about 3 minutes to about 30 seconds, respectively. Optionally, the liquid may be subjected to flash pasteurization at 115° C. to 120° C.

Alternatively, the kakadu plum juice can be concentrated by passing it through a vacuum evaporator, for example, a Turba-Film Evaporator available from Luwa of North Carolina, U.S.A., operating at or less than about 130° C. and 25 inches Hg (mercury) vacuum to a soluble solid range of about 25% to about 35%.

Drying the Concentrated Juice

Turning to Step 6, the concentrated kakadu plum juice is dried to produce a powder having an ascorbic acid content of preferably 20% to about 25%; more preferably 25% to about 30% and most preferably 35% to about 45% by weight and an ORAC value of preferably 2000 to about 3000; more preferably from about 3000 to about 5000; and most preferably greater than 5000. The moisture content of the dried powder is preferably less than about 6% and more preferably less than about 3%.

To dry the juice, a conventional apparatus such as a spray dryer, a vacuum dryer, a tray dryer or a freeze dryer may be used. In one embodiment, the juice is spray-dried. The concentrated juice may be heated before spray-drying to increase the drying effect. Preferably the inlet temperature in the spray dryer is at a temperature of from about 145° C. to about 160° C. and the outlet temperature is at a temperature of from about 100° C. to about 105° C. The dried particles preferably are such that a maximum of 80% of the particles can pass through a 100-mesh screen and at least 100% of the particles can pass through a 40-mesh screen.

The pH of the juice may also be adjusted to enhance the efficacy of drying. The preferred range of pH of the concentrate before drying is from about 3.5 to about 8.0. The pH may be adjusted by adding the appropriate amount of alkaline hydroxides of Group IA or alkaline earth hydroxides of Group IIA of periodic table of elements. Moreover, it has been discovered that manipulation of the pH during spray drying is in some cases is dependent on the amount of carrier combined with the kakadu juice concentrate. For example, if the carrier is present at about 30 to 40% by weight of the soluble solids in concentrated juice, the pH should be about 3.5 to about 5, more preferably about 4.5. If there is no carrier, then the pH should be about 5.0 to about 8.0, more preferably about 6.0. Where the carrier is from about 40% to about 45%, the pH should be about 4 to 5, more preferably about 4.5.

The powder formed by the present invention can be consumed orally to enhance the body's antioxidative response. The powder can also be tableted or combined with other ascorbic acids, e.g. pharmaceutical grade synthetic ascorbic acid, ascorbic acid from citrus, acerola, and the like, other anti-oxidants, phytochemicals, minerals and/or vitamins in a supplement. Optionally, the concentrated kakadu material created after any of the above steps may be isolated and incorporated into a nutritional supplement to provide high levels of natural ascorbic acid and ORAC available from kakadu material.

Oxygen Radical Absorption Capacity Assay

The Oxygen Radical Absorption Capacity (ORAC) assay is used to measure the antioxidative capacity of various antioxidants. The ORAC assay provides an effective measure of antioxidant protection afforded to physiologically important biomolecules such as proteins. Total radical absorbing capacity is determined by the following the decay of florescence from the protein phycoerythrin. U.S. Pat. No. 6,060,324 to Naguib and Cao and Prior's *Methods and Enzymology* (1999) 299:50-62, explain acceptable ORAC assays that may be used in the present invention, both are hereby incorporated by reference.

In the assays of the examples, the ORAC response is normalized to a chemical called trolox, also known as 6-hydroxy-2,5,7,8-tetramethylchroman-2-carboxylic acid, a water soluble Vitamin E analog often used in free radical assays. Unless otherwise stated, the ORAC values are expressed as a trolox equivalent value per gram of sample.

A known concentration of trolox was used as a calibration standard. Sodium ascorbate was run with the test samples as a control. The expected ORAC value for sodium ascorbate is 3404 μ moles trolox equivalent per gram.

Ascorbic Acid Assay

Unless otherwise provided, the determination of ascorbic acid or Vitamin C provided herein was performed using conventional iodine titration methodologies.

EXAMPLES

The following examples are presented for the purpose of further illustrating and explaining the present invention are not to be taken as limiting in any regard. Unless otherwise indicated, all parts and percentages are by weight.

Example 1

This example was used to determine various enzymes ability to digest kakadu plum material, thereby reducing the viscosity of the matrix. Pitted kakadu plum fruit from 1998 and 1999 harvests was mixed with 1.5 kg water containing enzyme in a blender at maximum speed for two minutes. The blender used was a four-liter Waring blender commercially available from Waring Products, Inc. of McConnellsburg, Pa., U.S.A. Different 400 gram aliquots of the resultant mixture was placed in separate 1000 milliliter (ml) Erlenmeyer flasks maintained at 40° C. for 2 hours. After enzymatic digestion, the solids are separated from the supernatant liquid. A Sorvall centrifuge (Model RC-5B available from Sorvall Inc., Newton, Conn., U.S.A.) was used to separate the solids. The centrifuge was operated at 8500 rpms for 30 minutes. The liquid extracts reach ambient temperatures of about 23° C. to about 25° C. and the viscosity of the supernatant was evaluated to determine the effectiveness of the enzymatic digestion. Table I on the following page provides viscosity measurements of the supernatant liquid generated by digestion of kakadu fruit by various enzymes. After testing viscosity and soluble solids, the remainder of each of the enzyme-treated extracts were freeze-dried, and tested for Vitamin C content and ORAC values. The results of this testing are also presented in Table I. All Vitamin C levels are presented in a percent dry weight basis. ORAC values are presented on Trolox equivalents/ gram.

TABLE I

Enzyme Evaluations

| Manufacturer | Enzyme Identifier | Type | Format | Minimum Activity | Enzyme Concentration in mg enzyme per ml of (mg/ml) stock solution (unless otherwise indicated) | Quantity (in ml) stock enzyme solution added per 400 gram slurry (ml/400 g) | pH | Soluble Solids (% by weight) | Viscosity, cps | Vitamin C | ORAC |
|---|---|---|---|---|---|---|---|---|---|---|---|
| Novo Nordisk | Pectinex Ultra SP L | Pectinase | Liquid | 26,000 PG/mL | 1/100 | 2/400 | 3 | 4.6 | 6 | 18.1 | 2250 |
| Novo Nordisk | Pectinex AR | Pectinase | Liquid | 2,000 FDU/mL | 1/100 | 2/400 | 3 | 4.6 | 5 | 18.7 | 2450 |
| Quest International | Biopectinase Super 7X | Pectinase | Liquid | 100,000 AJDU/mL | 0.5/100 | 0.5/400 | 3 | 4.6 | 5 | 20.2 | 2600 |
| Quest International | Biocellulase W | Cellulase | Liquid | 1,000 CellT u/ml | 10/100 | 1.7/400 | 3 | 4.6 | 53 | 17.9 | 1700 |

TABLE I-continued

Enzyme Evaluations

| Manufacturer | Enzyme Identifier | Type | Format | Minimum Activity | Enzyme Concentration in mg enzyme per ml of (mg/ml) stock solution (unless otherwise indicated) | Quantity (in ml) stock enzyme solution added per 400 gram slurry (ml/400 g) | pH | Soluble Solids (% by weight) | Viscosity, cps | Vitamin C | ORAC |
|---|---|---|---|---|---|---|---|---|---|---|---|
| Valley Research, Inc. | Crystalzyme PML-MX | Pectinase | Liquid | 130,000 AJDU/g | 1/100 | 1.2/400 | 3 | 4.8 | 4 | 18.0 | 1600 |
| MAK Wood, Inc. | Special Blend A (EZ 9100) | Pectinase | Liquid | 130,000 AJDU/g | 1/100 | 1.2/400 | 3 | 4.9 | 4 | 18.3 | 3300 |
| MAK Wood, Inc. | Special Blend B (EZ 9200) | Cellulase | Liquid | 13,000 CU/g | 13,000 cellulase units/g | 0.6/400 | 3 | 4.5 | 122 | 17.6 | 2150 |
| MAK Wood, Inc. | Special Blend C (EZ 9300) | Pectinase | Liquid | 50,000 ADJU/g | 1/100 | 3.2/400 | 3 | 4.9 | 5 | 17.4 | 2700 |
| Sigma-Aldrich, Inc. | Polygalacturonase | Polygalactur | Liquid | 300–1,500 u/mg prot | 20/10 | 2/400 | 3 | 4.8 | 101 | 19.8 | 2050 |
| Sigma-Aldrich, Inc. | Hemicellulase | Hemicellulase | Powder | 5 u/mg solid | 250/10 | 2/400 | 3 | 4.3 | 149 | 22.3 | 2300 |
| Sigma-Aldrich, Inc. | Cellulase | Cellulase | Powder | 0.3 u/mg solid | 0.5/10 | 2/400 | 3 | 4.5 | 29 | 21.7 | 2450 |
| Sigma Aldrich, Inc. | Xylanase | Xylanase | Powder | 100–300 u/mg prot | 0.5/10 | 4/400 | 3 | 4.3 | 189 | 21.7 | 2250 |
| Control $3_1$ | (Water and Kakadu) | n/a | n/a | n/a | n/a | n/a | 3 | 4.2 | 309 | 19.0 | 2700 |
| Control $4_1$ | (Water and Kakadu) | n/a | n/a | n/a | n/a | n/a | 3.5 | 4.2 | 202 | 19.0 | 2600 |
| Control $5_1$ | (Water and Kakadu) | n/a | n/a | n/a | n/a | n/a | 3.5 | 4.0 | 286 | 20.3 | 2250 |

As evident from Table I, without enzymatic digestion, the kakadu extracts remains extremely viscous. It has been discovered that it is difficult to create an efficient kakadu process, with high ascorbic acid/phytochemical levels and ORAC values, when working with the highly viscous kakadu fruit.

Example 2

Kakadu plum fruit harvested in 2000 was milled with a Urschel mill with a 0.75 inch mill head. Water was added to the milled kakadu flesh at a 1:1 ratio (24 kgs water:24 kgs kakadu fruit (including seeds)). 60 ml of a solution of Biopectinase Super 7× was added to the mixture at a concentration of (0.5 ml enzyme to 100 ml of water) (1:200). Digestion is continued with adequate mixing for 2 hours at 43.3° C. (110° F.). The slurry is then pressed to separate solids from the soluble phase using a Reitz screw press having a 30-mesh (0.0234 inch) screen. Screw pressing the slurry at 6 rpms resulted in a well de-watered cake. The seeds in the cake were intact and whole. The 38.5 kgs of expressed juice was tested at 4.1% soluble solids. The resultant 9.0 kgs of de-watered cake had a moisture content of 49.9%.

Example 3

Kakadu plum fruit harvested in 1998 was milled with a Urschel mill as in Example 2. Water was added to the milled kakadu flesh at a 1:1 ratio to yield 47.2 kg of slurry. With 60 ml of Biopectinase Super 7× added to the mixture at a concentration of 1:200, digestion is continued with adequate mixing for 90 minutes. The slurry is then pressed to separate solids from the soluble phase using a screw press having a 70-mesh 0.0083 inch screen. At 6 rpms, the cake de-watered well and the seeds were intact. The 47.2 kg of slurry produced 37.4 kg of expressed juice and 9.2 kg of de-watered cake having a moisture content of 49.9%. The soluble solids content of the expressed juice was 4.45%.

Example 4

Prior to enzyme extraction in Example 3, the ascorbic acid content of kakadu fruit (with pits) was tested via iodine titration and found to be 2.22% by weight (wet-weight basis). The fruit was tested for ORAC on a wet-weight basis and the ORAC value was 525.

Example 5

The fruit of Example 4 was freeze-dried. The ascorbic acid content of the freeze-dried material was tested and found to be 13%. The ORAC of the freeze-dried fruit was 2109.

Examples 6–11

Kakadu plum fruit was processed starting from whole kakadu fruit to the final spray dried powders in Examples 6–11. The ascorbic acid content and ORAC values of each example after different steps of processing are presented in Table II. The ascorbic acid content is presented in percent dry weight and the ORAC values are presented in Trolox per grams (dry weight) unless otherwise indicated. To obtain the dry weight values of ascorbic acid and ORAC values, the sampled material was freeze-dried.

In each of Examples 6–11, 50 kilograms of fresh-frozen kakadu fruit (2000 or 2001 harvest seasons as indicated)

were prepared. The ascorbic acid percent by weight and ORAC values of the fresh frozen fruit were tested on a wet basis, that is, the fruit was not freeze-dried. The results of testing are presented in Row 1 of Table II.

In another step, 50 kgs of milled frozen fruit is mixed with 50 kgs of tap water in a 1:1 ratio and milled with a Urschel mill fitted with a 0.75 inch mill head. The Biopectanese Super 7x enzyme in Table I was added to the mixture. Specifically, 125 ml of the Super 7x enzyme with a concentration of 0.005 mg per ml was added to the mixture. This mixture of fruit and water was mixed to create a slurry, which was incubated for 90 minutes.

In another step, the slurry was transferred to a screw press with a 30-mesh screen, operated at 6 rpms to create a raw extract and pressed cake (See, Rows 4 and 5 of Table II for ascorbic acid and ORAC values). The raw extract was pumped through an air-assisted bag filter having a 70-mesh screen pore size to carry out macrofiltration.

In another step, the extract was pumped through an ultrafiltration module fitted with FP-200 membranes having a 200,000 molecular-weight cutoff. During ultrafiltration, pressure was maintained at 10 bars and the temperature at 50° C. The resultant permeate and retentate after this ultrafiltration was measured for ascorbic acid content and ORAC values and recorded in Rows 7 and 8 of Table II.

In another step, the ultrafiltration permeate was run through a PCI membranes pilot filtration module fitted with reverse osmosis membranes, model numbers AFC-99. The pressure through the reverse osmosis membrane was maintained at about 45 to about 55 bars and the temperature was maintained at about 48° C. The system was run until about 18% to about 20% soluble solids was achieved in the extract concentrate. The ascorbic acid content and ORAC values are recorded in Row 9 of Table II. Optionally, this step may be substituted with a falling film evaporator technique wherein the ultrafiltration permeate would be run through a falling film evaporator system available from Turba-Film. In this alternative method, the maximum vacuum of the system would be maintained and the permeate would be run through the system at a temperature of 38° C. until a soluble-solid level of about 20% to about 25 % was achieved in the concentrate.

In another step, the concentrated extract (after further concentration, e.g., the reverse osmosis above) was spray dried. The concentrated extract was spray dried at two different pH levels: a "low" level having a pH 4.5 and a "high" level having a pH 7.5. High pH and low pH are indicated in Table II. A carrier was added to facilitate spray drying and included one or more of the following carriers: maltodextrin, modified starch and microcrystalline cellulose. Other carriers may be used as desired. The ascorbic acid content and ORAC values were tested with various carrier loads including 40%, 20% and 0% as reported in Rows 10–13 of Table II. As indicated in Table II, the running average ascorbic acid content the ascorbic acid percent dry weight basis of the extract is indicated in the Ascorbic acid running average column. Likewise, the running average ORAC values at 40% carrier and at 0% carrier are indicated in the ORAC value running average column in Table II.

TABLE II

Ascorbic Acid and ORAC Testing for Examples 6–11

| | | Example 6 | Example 7 | Example 8 | Example 9 | Example 10 | Example 11 | Running Avg. | Example 6 | Example 7 | Example 8 | Example 9 | Example 10 | Example 11 | ORAC Value Running Avg. |
|---|---|---|---|---|---|---|---|---|---|---|---|---|---|---|---|
| | Harvest Season: | 2000 | 2000 | 2001 | 2001 | 2001 | 2001 | | 2000 | 2000 | 2001 | 2001 | 2001 | 2001 | |
| | | Ascorbic Acid % Content | | | | | | | ORAC Values | | | | | | |
| 1 | Whole Fruit, Fresh-Frozen (wet weight basis) | 2.4 | 2.2 | 2.2 | 2.2 | 2.2 | | | na | na | na | na | | | |
| 2 | Whole Fruit, milled | 13.8 | 13 | 15.4 | 17.2 | 12.2 | | | 1563 | 2109 | 1425 | 2294 | 1969 | | |
| 3 | Slurry | 12–15.8 | 13.6 | 14.3 | 16.1 | 14 | na | | 1650–2375 | 1921 | mt | 2637 | 1755 | | |
| 4 | Raw Extract | 29.1 | 30.4 | 24.8 | 27 | 24.8 | 21.6 | | 3213 | 3254 | 2607 | 2943 | 3644 | 3351 | |
| 5 | Press Cake | 1.5–4.3 | na | na | 2.9 | 2.8 | na | | 740–1530 | na | na | 1962 | 2288 | | |
| 6 | Extract, Post Macro-Filtration | 29.6 | 30.9 | 24.6 | 26.7 | (19.8) wet | 22 | | 4811 | 3174 | 3187 | 2713 | 3590 | 2634 | |
| 7 | Permeate, Post Ultra-Filtration | 32.1 | 36.2 | 28.7 | 31.4 | 27.4 | 25.8 | | 5600 | 3576 | 3264 | 4037 | 4208 | 3285 | |
| 8 | Retentate, Post Ultra-Filtration | 9.4/0.5 | na | 9 | 11.5 | 4.4 | 4.7 | | na | na | na | 2568 | 2338 | 1794 | |
| 9 | Extract, Post Concentration | 30.8 | 32.7 | 25.5 | 28.8/29.7 | 27.3 | 24.1 | | 5286 | 4269 | 3420 | 4648/4301 | 3647 | 2582 | |
| | Spray-Dried Powders: | | | | | | | | | | | | | | |
| 10 | 40% Carrier (high pH) | 21.8 | 24.4 | 18.2 | na | na | na | | 2238 | 1548 | 1786 | na | na | na | |
| 11 | 40% Carrier (low pH) | na | 23.9 | 19.1 | 20.1/20.1 | 19.4 | na | 20.5 | na | 1582 | 2025 | 3569/2840 | 2871 | na | 2577 |
| 12 | 20% Carrier (high pH) | 24.8 | na | na | na | na | na | | 2387 | na | na | na | na | na | |
| 13 | 0% Carrier (high pH) | na | na | 23.7 | 25.9/26.4 | 25.3 | na | 25.3 | na | na | 2777 | 3567/3098 | 2768 | na | 3053 |

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, and the like, are to be understood as modified by the word "about" in describing the broadest scope of the invention. Unless otherwise stated, all parts and percentages are by weight. Any reference to an item in the disclosure or to an element in the claim in the singular using the articles "a," "an," "the," or "said" is not to be construed as limiting the item or element to the singular unless expressly so stated.

The invention claimed is:

1. A method for preparing a dried powder from *Terminalia ferdinandiana* fruit comprising:
    disintegrating *Terminalia ferdinandiana* fruit to form a slurry of flesh and dissolved solids in an aqueous phase, the slurry having a viscosity;
    adding at least one enzyme to the slurry to reduce the viscosity of the slurry and increase the dissolved solids in the aqueous phase;
    expressing the slurry to separate the dissolved solids from the flesh and form a juice;
    concentrating the juice to produce a juice concentrate with ultrafiltration;
    dryng the juice concentrate to produce a *Terminalia ferdinandiana* powder.

2. The method of claim 1 wherein the *Terminalia ferdinandiana* powder has an ascorbic acid content at least 15%.

3. The method of claim 1 wherein the *Terminalia ferdinandiana* powder has ascorbic acid content of at least about 25%.

4. The method of claim 1 wherein the *Terminalia ferdinandiana* powder has ascorbic acid content of at least about 45%.

5. The method of claim 1 wherein the *Terminalia ferdinandiana* powder has an ORAC value of at least about 1000.

6. The method of claim 1 wherein the *Terminalia ferdinandiana* powder has an ORAC value of at least about 3000.

7. The method of claim 1 wherein the *Terminalia ferdinandiana* powder has an ORAC value of at least about 5000.

8. The method of claim 1 wherein, the enzyme is selected from the group consisting of pectinase and cellulase.

9. The method of claim 1 wherein the slurry is expressed with a device selected from the group consisting of a screw press, a hydraulic press and a juicer.

10. The method of claim 1 further comprising concentrating the juice concentrate with reverse osmosis.

11. The method of claim 1 further comprising concentrating the juice concentrate with a fallin-film in evaporator.

* * * * *

UNITED STATES PATENT AND TRADEMARK OFFICE
CERTIFICATE OF CORRECTION

PATENT NO. : 7,175,862 B2 Page 1 of 1
APPLICATION NO. : 10/767934
DATED : February 13, 2007
INVENTOR(S) : Pusateri et al.

It is certified that error appears in the above-identified patent and that said Letters Patent is hereby corrected as shown below:

Column 14, Claim 11, Line 27:
  "fallin-film in" should be --falling-film--

Signed and Sealed this

Seventeenth Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,175,862 B2
APPLICATION NO. : 10/767934
DATED : February 13, 2007
INVENTOR(S) : Donald J. Pusateri et al.

It is certified that error appears in the above-identified patent and that said Letters Patent is hereby corrected as shown below:

Title Page;
(73) Assignee:
  "Access Business Group International LLC" should be --Access Business Group International LLC and Cognis Australia Pty. Ltd.--

Signed and Sealed this

Twenty-fourth Day of June, 2008

JON W. DUDAS
*Director of the United States Patent and Trademark Office*